(12) United States Patent
Haimer

(10) Patent No.: US 9,180,527 B2
(45) Date of Patent: Nov. 10, 2015

(54) QUICK CHANGE SYSTEM

(75) Inventor: Franz Haimer, Igenhausen (DE)

(73) Assignee: FRANZ HAIMER MASCHINENBAU KG, Hollenbach-Igenhausen (DE)

(*) Notice: Subject to any disclaimer, the term of this patent is extended or adjusted under 35 U.S.C. 154(b) by 1197 days.

(21) Appl. No.: 12/671,584

(22) PCT Filed: Jul. 31, 2008

(86) PCT No.: PCT/EP2008/006325
§ 371 (c)(1),
(2), (4) Date: Feb. 1, 2010

(87) PCT Pub. No.: WO2009/043407
PCT Pub. Date: Apr. 9, 2009

(65) Prior Publication Data
US 2011/0233839 A1    Sep. 29, 2011

(30) Foreign Application Priority Data
Aug. 2, 2007  (DE) .................. 10 2007 036 144

(51) Int. Cl.
*B23B 31/113* (2006.01)
*B23B 31/22* (2006.01)
(Continued)

(52) U.S. Cl.
CPC ........... *B23B 31/4026* (2013.01); *B23B 31/113* (2013.01); *B23B 31/261* (2013.01);
(Continued)

(58) Field of Classification Search
CPC   B23B 31/113; B23B 31/263; B23B 31/4086; B23B 31/4026; B23B 2260/032; G01M 1/04
USPC .............. 279/2.19, 2.2, 2.23, 14, 72, 81, 127, 279/901; 269/9
See application file for complete search history.

(56) References Cited

U.S. PATENT DOCUMENTS 2,731,273 A * 1/1956 Edens .............................. 279/81
3,405,950 A * 10/1968 Cox ............................... 279/103
(Continued)

FOREIGN PATENT DOCUMENTS

| CN | 1195309 A | 10/1998 | |
| DE | 3939423 A1 * | 6/1991 | .............. B23B 31/02 |

(Continued)

OTHER PUBLICATIONS

International Preliminary Report on Patentability, dated Apr. 15, 2010.
(Continued)

*Primary Examiner* — Eric A Gates
(74) *Attorney, Agent, or Firm* — Warner Norcross and Judd LLP

(57) ABSTRACT

A clamping device (1a) for clamping a work piece of a rotating spindle of a machine tool, in particular a balancer, wherein the clamping device comprises a base body (2), which is configured to be fixated at the spindle and which comprises at least one change body (1) which can be coupled to and decoupled from the base body (2), wherein the change body (1) and the base body (2) are supported coaxial to one another and clamped relative to one another in radial direction by roller elements (11), wherein each of the roller elements (11) is disposed in a gap between the base body (2) and the change body (1), which is configured as a wedge shaped gap and adapted to the respective roller element (11), so that the respective roller element can be moved along the wedge shaped gap, deeper into the wedge shaped gap, when the base body (2) and the change body (1) are connected to one another, so that the desired radial clamping is provided.

20 Claims, 8 Drawing Sheets

(51) Int. Cl.
  B23B 31/40 (2006.01)
  B23B 31/26 (2006.01)
  G01M 1/04 (2006.01)

(52) U.S. Cl.
  CPC ........... B23B31/263 (2013.01); B23B 31/4086 (2013.01); G01M 1/04 (2013.01); *B23B 2260/022* (2013.01); *B23B 2260/032* (2013.01); *B23B 2260/034* (2013.01); *B23B 2265/32* (2013.01); *Y10S 279/901* (2013.01); *Y10T 279/1045* (2015.01); *Y10T 279/1224* (2015.01); *Y10T 279/17803* (2015.01); *Y10T 279/17957* (2015.01)

(56) References Cited

U.S. PATENT DOCUMENTS

| | | | |
|---|---|---|---|
| 3,747,946 A * | 7/1973 | Edens | 279/81 |
| 4,002,348 A * | 1/1977 | Johnson | 279/75 |
| 4,563,116 A | 1/1986 | Edens | |
| 4,699,389 A * | 10/1987 | Buck | 279/52 |
| 4,767,077 A * | 8/1988 | Kataoka | 242/571.7 |
| 4,775,269 A * | 10/1988 | Brix | 408/239 R |
| 4,981,057 A * | 1/1991 | von Haas et al. | 82/160 |
| 5,201,621 A | 4/1993 | McMurtry et al. | |
| 5,322,304 A | 6/1994 | Rivin | |
| 5,595,391 A | 1/1997 | Rivin | |
| 5,810,366 A * | 9/1998 | Montjoy et al. | 279/43 |
| 5,921,563 A * | 7/1999 | Huggins et al. | 279/131 |
| 5,947,484 A * | 9/1999 | Huggins et al. | 279/43.4 |
| 6,213,230 B1 * | 4/2001 | Fuss | 175/389 |
| 6,273,080 B1 | 8/2001 | Sullivan, Jr. | |
| 7,896,589 B2 * | 3/2011 | Miller et al. | 408/226 |
| 7,896,590 B2 * | 3/2011 | Miller et al. | 408/226 |
| 8,209,840 B2 * | 7/2012 | Norton | 29/428 |
| 2005/0163559 A1 | 7/2005 | Chang | |

FOREIGN PATENT DOCUMENTS

| | | | |
|---|---|---|---|
| DE | 29980181 | 9/2001 | |
| DE | 202004009500 U1 | 8/2004 | |
| EP | 0901858 | 3/1999 | |
| GB | 568225 | 3/1945 | |
| WO | WO 9108072 A2 * | 6/1991 | B23B 31/11 |
| WO | 0045983 | 8/2000 | |

OTHER PUBLICATIONS

English translation of DE 299 80 181 U1.
PCT/ISA/210—International Search Report.

* cited by examiner

QUICK CHANGE SYSTEM

BACKGROUND OF THE INVENTION

The invention relates to a clamping device for clamping a work piece at a rotating spindle of a machine tool and in particular at a balancer.

A clamping device of this type is known from the German utility model DE 299 80 181. The known clamping device is comprised of a base body or a base body unit with a receiver opening concentric to the spindle, into which receiver opening a coupling shaft of the work piece can be axially inserted from a face end. Said coupling shaft is typically a respective section of a tool holder or of a tool chuck.

In general, but in particular also, where the clamping device is a component of a balancer, high demands exist with respect to the coaxial arrangement of the work piece or the tool holder or the tool chuck and the base body. The desired coaxiality is assured in the prior art, in that the coupling shaft is configured as a centering cone, which is pulled into an accordingly configured conical receiver at the base body or the base body unit. In said prior art, the centering cone and the accordingly configured conical receiver are designated as fit surfaces.

As already indicated by the term "fit surface", in order to be able to center in this manner with the desired precision, the centering cone of the coupling shaft and the conical receiver associated therewith each have to be fitted very closely, so that the centering cone and the conical receiver associated therewith mate "flush". Greater tolerances and in particular angle deviations lead to malfunctions and therefore are not permissible.

This means, however, that only work pieces or tool holders, which comprise a particular tightly fitted coupling shaft, can be clamped with the same base body unit. When work pieces or tool holders shall be clamped with a slightly different coupling shaft, it becomes necessary to replace the base body unit with another base body unit, which in turn comprises an accordingly configured conical receiver. For this purpose, the particular base body unit must be unthreaded from the hollow spindle, and the other base body unit must be threaded onto the hollow spindle. It is self-evident that this generates considerable complexity.

In view of this, it is an object of the invention to show an option how work pieces or tool holders with various coupling shafts or even centering bore holes can be clamped without replacing the base body unit.

SUMMARY OF THE INVENTION

The invention provides the option not to have to dismount the base body unit or the base body each time when a work piece or a work piece holder with another coupling shaft or with another centering bore hole shall be clamped. Instead, it suffices to replace the change body with another change body, which in turn is adapted to the other work piece, which is possible with the described clutch in a very simple and precise manner.

Another disadvantage of the prior art recited supra is that the centering cone used therein and the conical receiver associated therewith each have to be fitted very closely, and have to be matched very precisely in order to facilitate a precise and coaxial alignment and a precise clamping. Even small deviations of the cone angle of the centering cone from the cone angle of the associated conical receiver lead to problems. Furthermore, tightening and in particular loosening the known cone fit is rather uncomfortable since it requires a large amount of force.

Therefore, it is another object of the invention to provide a cone coupling for said application, which cone coupling is much more tolerant with respect to diameter and angle deviations, and which can be operated with much less force, in particular disengaged.

Due to the fact that the conical surfaces do not contact each other anymore directly, but are only in local contact with one another through roller elements, diameter and/or angle deviations can be compensated to a much larger extent through local elastic deformation. Furthermore, the forces are substantially reduced which are required for joining or disengaging the cone coupling. The makes the cone coupling much more operator friendly.

Further variations, modes of operation and advantages of the invention can be derived from the subsequent embodiments described with reference to FIGS. 1 through 13, where FIGS. 1 through 6 show a first embodiment, and FIGS. 7 through 13 show a second embodiment.

DESCRIPTION OF THE CURRENT EMBODIMENT

Figure 1:
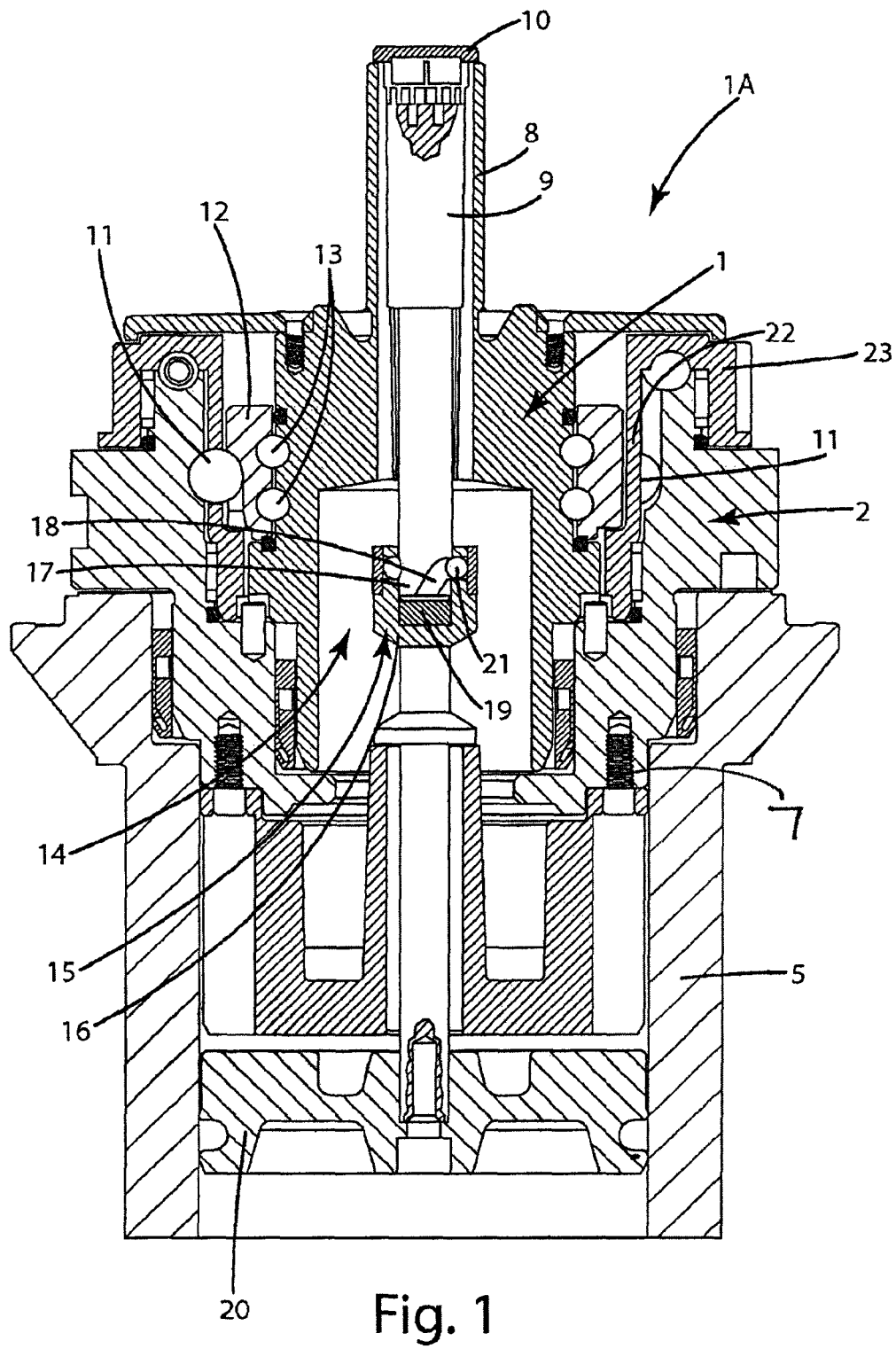
FIG. 1 is cross-sectional view of a clamping device.

FIG. 1 shows a first embodiment of the clamping device 1a according to the invention. Such a clamping device is used in particular for clamping work pieces, which need to be balanced like e.g. drill bits, milling bits, or similar work pieces at a balancing machine. The clamping device 1a is comprised of a multi component change body 1 and a base body 2, which also has components. The base body 2 is inserted into a hollow spindle 5. Removable, it is mounted at the hollow spindle 5 by means of a threaded connection 7, which is only indicated in the drawing FIG. 1.

The change body 1 comprises a cone coupling in the embodiment illustrated herein which will be described in more detail and which is comprised of a clamping sleeve 8 as well as a clamping cone 9. The cone coupling is used for connecting the change body 1 to the work piece, which shall be mounted to the spindle of the machine tool so it rotates. Said clamping sleeve 8 can be inserted e.g. into a borehole of a work piece and can be clamped in said borehole. For this purpose, the clamping sleeve 8 is configured, so that it can be expanded by means of a clamping cone 9, and typically slotted. This way the work piece is then mounted at a hollow spindle 5 of a machine tool, which is not shown in detail and can be driven to rotate by the hollow spindle 5. Instead of the clamping sleeve 8, shown herein, the change body 1 can be provided with a clamping sleeve into which a chuck is inserted by means of which the shaft of a work piece can be clamped by compressing the chuck through the clamping sleeve as soon as the chuck is pulled into the clamping sleeve.

The change body 1 can be decoupled from the base body 2 and removed, in order to replace it with another respective change body. The purpose of this is to be able to quickly configure the base body 2 with another cone coupling. This way a change from clamping a work piece at its centering borehole provided for this purpose to clamping another work piece at its shaft can be performed quickly. Simultaneously, a very quick transition to clamping another work piece with a totally different diameter is possible in this manner. All these steps are possible without having to unthread the base body from the hollow spindle 5 first and having to replace it with another base body.

An important aspect of the invention is the manner of how the respective change body 1 can be coaxially connected with the base body 2 and clamped against the base body 2 without clearance.

This is performed by three roller elements 11, which are arranged between the respective change body 1 and the base body 2 and, which are arranged substantially symmetrically along the circumferences of the change body 1 and of the base body 2. In the present case, the roller elements 11 respectively enclose an angle of 60 degrees among each other. Also more than the three roller elements which are shown here can be provided. On the other hand, less than the three roller elements shown shall not be provided since a truly coaxial clamping between the change body 1 and the base body 2 can otherwise not be provided in a reliable and virtually friction free manner.

Figure 2:
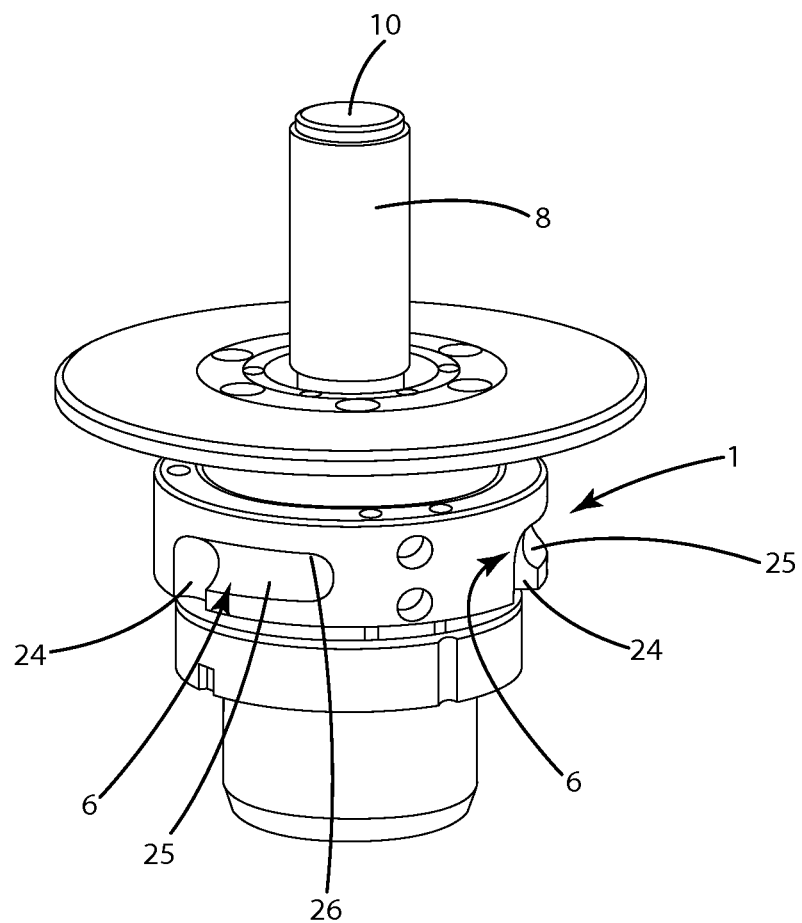
FIG. 2 is a change body of the clamping device shown in FIG. 1.

In order to implement the desired clamping, each of the roller elements 11 is disposed in this embodiment in a groove 6 configured at the change body 1 as shown in FIG. 2. It is appreciated that FIG. 2 shows the change body 1 in a state where it is removed from the base body 2. Said groove in the change body 1 supports the respective roller element 11 received by it through its groove flanks. The respective roller element 11 also runs in a groove on the side of the base body 2 as shown on the left side of FIG. 1. This way the change body 1 and the base body 2 are held in a precise position at one another in axial direction as well.

The groove 6 comprises an onset portion 24, in which the imaginary groove axis or the centerline of the groove extends substantially in the direction of the common rotation axis of the base body 2 and of the change body 1. The roller element 11 can be inserted into said onset portion 24 by sliding the groove 6 onto the axial body 11 in axial direction or vice versa. A circumferential portion 25 of the groove connects to said onset portion 24, wherein the imaginary groove axis or centerline of the groove extends substantially in the direction of the circumference of the base body or the change body. In the embodiment, shown in the Figures, it is even the case that the imaginary groove axis in the circumference portion of the groove extends exactly in the direction of the circumference of the base body 2 or of the change body 1. In the embodiment shown in the Figures, the imaginary groove axis extends in the circumferential portion of the groove at a slight slant angle relative to the circumference of the base body 2 or the change body 1, thus slanted so that it forms a type of "thread", through which the change body 1 is pulled tight against the base body along an axis, which is a common axis with the base body 2, when the roller elements are pressed deeper into the groove 6 through rotating their bearing cage 22.

Thus the groove 6 is configured so that it forms a wedged gap. This means that the depth of the groove 6 decreases towards its end 26. Preferably, it is also the case that the depth of the groove 6 already decreases in its onset portion 24. This assures that a defined friction is established immediately between the roller element 11 and the groove 6 at the change body 1 as well as the other groove at the base body 2 as soon as the change body 11 is inserted into the onset portion 24 of the groove. In any case, the depth of the groove 6 decreases along its circumference portion 25. The configuration of the groove 6 at the change body 1 and of the groove at the base body 2 is selected according to the roller element 11 so that the roller element 11 rolls substantially, and preferably, completely on the side of the change body 1 as well as on the side of the base body 2, when the roller body 11 is inserted deeper into the groove 6, thus towards the end 26 of the groove. Since the groove 6 forms a wedged gap as recited, the roller element 11 clamps the change body 1 and the base body 2 relative to one another, more and more the further the roller element 11 is inserted into the groove 6.

By the fact that the depth of the groove 6 also decreases over its circumference, the change body 1 and the base body 2 are secured against a rotation relative to each other.

Thus the groove 6 is configured so that it forms a wedge shaped gap. This means that the depth of the groove 6 decreases towards its end 26. Preferably, it is also the case that the depth of the groove 6 already decreases in its onset portion 24, so that the required coaxial alignment and clamping of the change body and of the base body relative to one another is already achieved when the groove 6 is slid over the roller elements in axial direction. The configuration of the groove 6 at the change body 1 and of the groove at the base body 2 is selected according to the roller element 11, so that the roller element 11 rolls substantially, and preferably, completely on the side of the change body 1 as well as on the side of the base body 2, when the roller body 11 is inserted deeper into the groove 6, thus towards the end 26 of the groove. Since the groove 6 forms a wedged gap as recited, the roller element 11 clamps the change body 1 and the base body 2 relative to one another more and more, the further the roller element 11 is inserted into the groove 6.

The change body 1 and the base body 2 are secured against a rotation relative to each other through the end 26 of the groove 6, namely through form locking, in case the depth of the groove 6 in its circumferential portion 25 does not decrease more and more.

Figure 3:
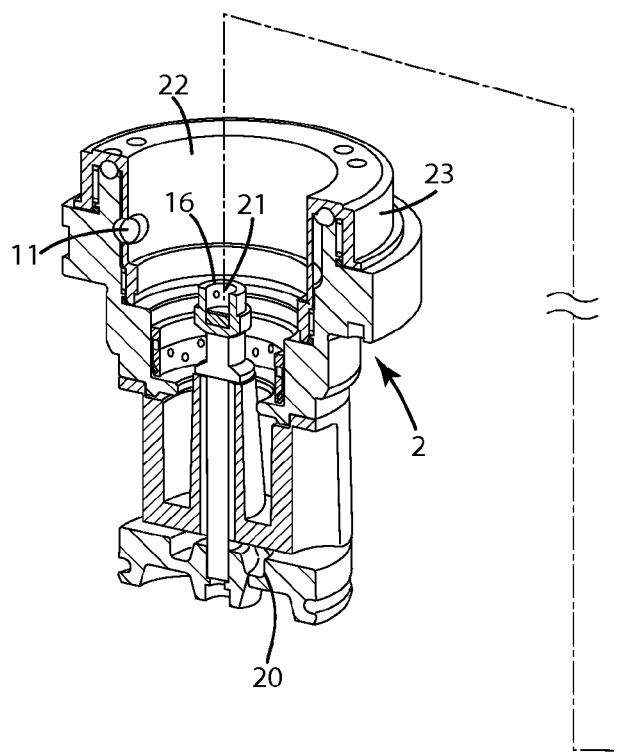
FIG. 3 is a cross-sectional view of a base body of the clamping device shown in FIG. 1.

As shown most clearly in FIG. 3, which shows the base body 2 with the change body 1 removed, the roller elements 11 are retained in a cage 22, from which they protrude on the side of the change body 1 as well as on the side of the base body 2. Thus the cage 22 is configured, so that it has a collar 23, which is disposed outside of the gap between the base body 2 and the change body 1 and, which can be gripped from the outside and rotated.

By rotation of the cage 22, the roller elements 11 can be rolled into their respective grooves 6 in the direction towards the ends of the grooves. By rotating the cage 22 in the opposite direction, the roller elements 11 can be rolled out of their respective grooves towards the onset areas of their respective grooves. In the embodiment shown here, this is possible in each case without having to rotate the base body 2 or the actual, that is to say the entire change body 1. For this purpose, the respective grooves 6 are not directly fabricated in the actual change body 1, but in an intermediary ring 12, which is supported nearly frictionless by means of a ball bearing on the actual change body 1, cf. FIG. 4, which shows a sectional view of the change body 1 along its axis of rotation. Said ball bearing is provided here in the form of a double-row groove ball bearing, which supports the intermediary ring 12 not only rotatable, but also in position. It is evident, that the intermediary ring 12 rotates, as soon as the roller elements 11 roll into the groove 6 or out of the groove 6 and thereby roll off on the intermediary ring 12 through the rotation of the cage 22. The coupling implemented in this way through the roller elements 11 and the groove, operates very smoothly. There is no friction, which could prevent that the change body 1 and the base body 2 are forced into an exactly coaxial position relative to each other and are clamped against each other by means of the roller elements 11. At the same time, the coupling can be operated with minimum effort.

For the sake of completeness, it is theoretically possible to provide the groove 6 with a constant depth and to implement the wedge shaped gap by varying the depth of the groove in the base body 2, which is not shown in the Figures. The initially described variant shown by the Figures, where the depth of the groove 6 is variable, is preferable, since then there is no preferred position, which one would have to follow when joining the change body 1 and the base body 2 to assure the desired effect—apart from the fact that the balls 11 have to be inserted respectively into the onset portions 24 of their associated grooves 6.

Figure 4:
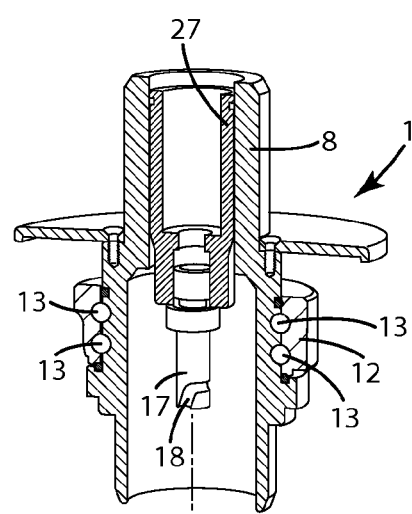
FIG. 4 is a cross-sectional view of the change body shown in FIG. 2.
Figures 5, 6:
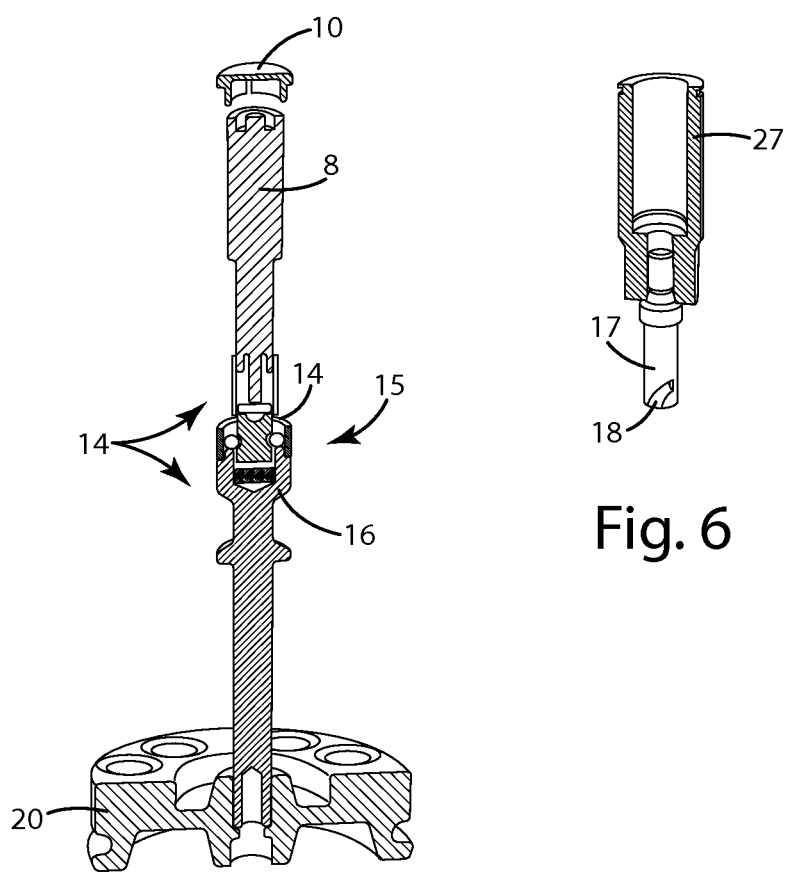
FIG. 5 is detailed view of a piston, tension rod sleeve, and clamping sleeve.
FIG. 6 is a detailed view of a chuck, tension rod, and tension rod grooves.

FIG. 1 but also the combination of the FIGS. 3, 4 and 5 show an additional essential aspect of the invention, which is relevant in particular for such change bodies 1, which are provided with a chuck 27 for clamping a work piece at its shaft provided for this purpose—thus only the FIGS. 3, 4 and 5 show a change body 1 that is provided with a chuck 27, while the change body 1 shown in FIG. 1 is provided with a clamping cone for expanding a clamping sleeve for clamping a work piece at its center bore hole, which is intended for this purpose. However, this is not the point, since the crucial mechanism that will be explained infra is always the same in principle.

The chuck 27 or the clamping cone 9 are provided with a tension-/compression device 14, subsequently designated as tension rod, which is loaded by means of a linear actuator with tension- or compression forces. The linear actuator is implemented here in form of a bidirectionally acting pneumatic cylinder, whose piston 20 is connected with the tension rod 14 and glides in the hollow spindle 5, which forms a cylinder in this portion. Depending on the direction in which the piston 20 is loaded with compressed air, the chuck 27 or the clamping cone 9 are pulled deeper into the clamping sleeve 8 or driven out of the clamping sleeve 8. In this way, the cone coupling comprised of the chuck 27 or the clamping cone 9, and clamping sleeve 8 can be closed or opened.

Thus, it is the crucial aspect that the tension rod 14 is implemented with two components and that both components can be connected with each other or separated from each other by means of the tension rod coupling 15. The tension rod coupling here is comprised of a tension rod sleeve 16 and a tension rod bolt section 17. The tension rod bolt section 17 is provided with at least one tension rod groove 18. In the particular embodiment, two tension rod grooves are provided in 18. Accordingly the tension rod sleeve is provided with two protrusions—here in the form of balls—which engage both tension rod grooves 18. The tension rod grooves 18 are configured respectively in form of a bayonet catch. That is, they comprise an engagement surface at each of their ends, at which the roller elements engage, when the tension rod bolt segment 17 with its tension rod grooves 18 is turned into the tension rod sleeve 16 against the force of the axial spring 19.

A compressible elastomer layer is applied here as an axial spring. Instead of that, for instance, a coil spring can be used just as well.

It is important that the chuck 27, the clamping sleeve 8, and the tension rod 14 are sized according to the stroke of the piston 20 so that the chuck 27 in a detached condition comes clear so far, that the coupling can be operated and possibly at the same time comes clear so far, that it protrudes for some distance upward from the clamping sleeve 8. Namely so far that the chuck 27 can be gripped, rotated, and if need be, pressed in or pulled out to disengage or engage the tension rod coupling 15 in this manner.

The tension rod coupling 15 facilitates dismantling the change body 1 while the piston 20 remains at the base body 2 and, hence, avoids unnecessary complexity in the sense that each change body 1 must be provided with its own piston 20 or linear actuator respectively for the chuck 27 or for the clamping cone 9 respectively. Another important advantage of the tension rod coupling 15 is comprised in that it becomes possible to separate the chuck 27 from the base body 2 and the change body 1, without uninstalling the change body 1, and to replace it with a chuck with another clamping diameter. This way, the chuck according to the invention can adapted to the different work pieces in particular flexible manner.

Peripherally, it should be noted that the tension rod coupling 15 does not have to be implemented as a bayonet coupling. Rather the coupling can be implemented, for example, as a regular screw thread, in which the tension rod bolt segment 17 is screwed into an appropriate thread of the tension rod sleeve 16. However, a bayonet coupling is more useful, because it can be opened and closed with few movements.

Figure 7:
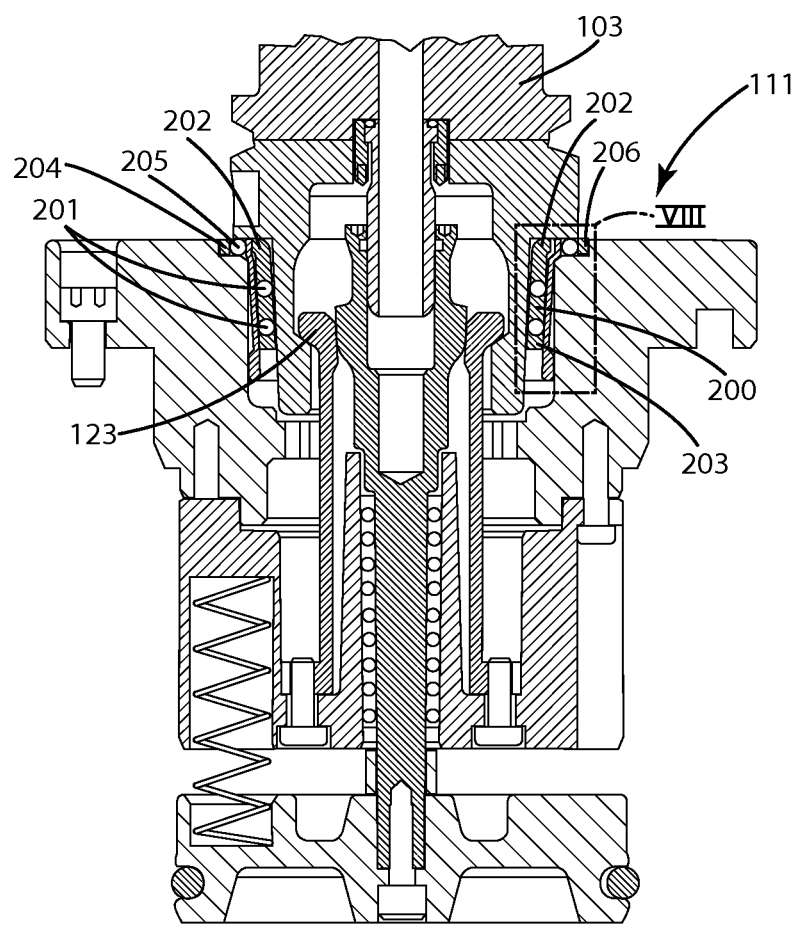
FIG. 7 is a cross-sectional view of a clamping device.

The FIGS. 5, 6 and 7 show another embodiment of the invention.

This embodiment with respect to its basic concept corresponds to a relatively large extent to the utility model of the applicant published under the number DE 29980181, so that reference can be made to the utility model publication regarding the question of how this embodiment operates. However, in this embodiment no separate change body is provided between the base body and the work piece, which in turn holds the work piece. Rather it is the case here that the work piece 103 itself namely the displayed chuck, forms the change body in the sense of the invention. Instead, the work piece 103 in this case, which is preferentially a chuck for cutting tools, is directly inserted into the base body or the base body unit 111 and is pulled by the chuck 122 to the base body 111, where it is firmly retained at the base body 111.

Differently from the utility model application, which describes the basic concept for this design, the work piece 103 is not inserted in the base body 111 with a fit, (1 transition fit).

Instead, it is provided according to the invention to insert the tool holder into the base body with roller elements placed there between, so that the tool holder and the base body are supported by the roller elements coaxially relative to one another in a completely coupled condition, and clamped in radial direction against one another as shown in FIG. 5.

The base body 111 is configured here with a respective oversize relative to the associated seat of the tool holder 103, so that a gap 200 is created in which the roller elements 201 are located. These roller elements 201 clamp the tool holder 103 substantially in radial direction against the base body 101.

The basic principle of this embodiment corresponds to a large extent to the utility model of the applicant published as DE 299 80 181, so that the publication document of said utility model is incorporated by reference regarding the question how this embodiment functions in detail.

Different from said utility model application, which provides the basic concept for this design, the centering cone of the tool holder 103 and the respective inner cone of the base body 111, however, are not in direct contact according to the invention. Instead, they are only in indirect contact, thus through roller elements, which are disposed in the gap between said two cone surfaces, which is subsequently referred to as "cone gap". Said cone gap is characterized in that it has substantially constant height over its extension, which, however, becomes smaller and smaller, the deeper the centering cone of the tool holder is pulled or pressed into the inner cone of the base body.

Thus, it is essential according to the invention to insert the tool holder into the base body with roller elements placed there between, so that the tool holder and the base body, in a state where they are completely coupled to one another, are supported by the roller elements coaxial relative to one another and clamped relative to one another in radial direction as shown in FIG. 7. The clamping is provided by the conical gap becoming smaller and smaller, the deeper the tool holder and the base body are moved into one another.

It is essential that the contact, which is only punctiform between the centering cone of the tool holder 103 and the inner cone of the base body, facilitates a compensation of diameter tolerances or angle deviations between the conical surfaces, rather than this is the case for conical surfaces contacting one another directly. This is because the roller elements or the surfaces supporting them go through a punctiform elastic deformation in response to such tolerances, which deformation has a compensating effect. This occurs even more when a respective spring element 203 is provided which is more elastic by orders of magnitude than a roller element or the opposite surface locally supporting it.

The roller elements 201 are retained in a bearing cage 202 from which they protrude on the side of the tool holder 103 as well as on the side of the base body 111. The bearing cage preferably comprises a collar 204 overlapping the upper edge of the opening in the base body 111, in which collar additional roller elements 205 are disposed. The latter serve as stops for the tool holder in axial direction.

As one can see, the gap 200 is configured slightly conical. Also the respective seat in the tool holder 130 is configured slightly conical. In this way, the tool holder 130 can be easily inserted into the opening at the base body 111, in which the roller elements 201 are already retained by their bearing cage 202. Here as a rule, different from the previous embodiment, the tool holder 103, the base body 111 and the roller elements 201, as well as if necessary the spring element 230, are adjusted to one another, so that the roller elements 201 slip through either on the side of the tool holder or on the side of the base body or the spring element respectively and therefore turn "on the spot" when the tool holder 103 is inserted into the base body 111.

It is evident that the gap 200 is configured slightly conical. Also, the respective seat at the tool holder 103 is configured slightly conical. This way the tool holder 103 can be inserted easily into the opening at the base body 111, in which the roller elements 201 are already retained by their bearing cage 202, since at least the onset of the centering cone of the tool holder can initially pass the roller elements unobstructed until the conical gap becomes small enough when the tool holder is inserted further into the base body, so that the roller elements start carrying a load.

Figure 7A:
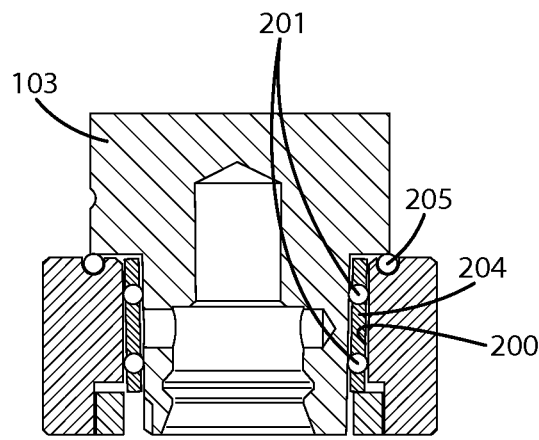
FIG. 7A is a detailed cross-sectional view of a collar and bearing cage of the device.

In as far as the bearing cage 202 is provided with a collar according to FIG. 7*a*, it is now the case, that differently from the prior embodiment the tool holder 103, the base body 111 and the roller elements 201 and possibly the spring element 203 are adjusted to one another, so that the roller elements 201 either slide through on the side of the tool holder or on the side of the base body or the spring element, and therefore rotate "on the spot", when the tool holder 103 is inserted into the base body 111.

Figure 7B:
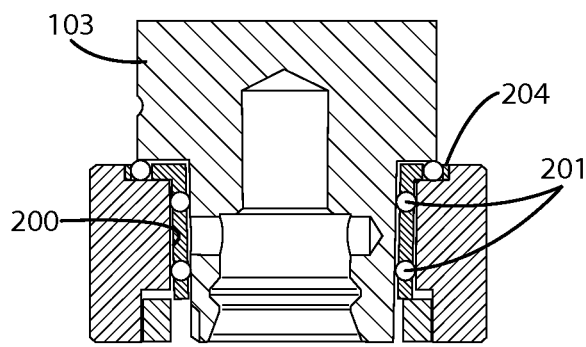
FIG. 7B is a detailed cross-sectional view of a collar and bearing cage of the device.

In as far as the bearing cage 202 is configured according to FIG. 7*b*, the balls or the roller elements 201 can roll off, so that the bearing cage 202 with the roller elements can at least move by some distance into the gap between the tool holder and the base body when the tool holder is inserted. In this case, the bearing cage advantageously contacts a spring element 207 in the direction that keeps it in its ready position at the base body after the tool holder is pulled out, which is not shown in the Figures. The spring element can be an elastomeric block in the simplest case; however, a metal spring is preferable.

Advantageously, the bearing cage 202 has the characteristic that it is elastic enough to allow that the roller elements 201 are pressed in radial outward direction in the course of the insertion of the work piece holder 103 and therefore contact the base body 111 evenly or are clamped thereon, compensating for diameter differences or angle differences on the part of the tool holder 103. In other words, the bearing cage 202 facilitates a diameter compensation or angle compensation through elastic expansion. The bearing cage is made of an appropriately elastic material.

In order to elastically clamp the tool holder 103 and the base body 111 together through the roller elements 201, it can suffice to use the inherent elasticity of the roller elements 201 as well as of the tool holder 103 and of the base body 111. This is designated as direct support, which is configured as illustrated in FIG. 7*a* or 7*b*. The difference between the two designs shown in these Figures is only comprised in whether they are integrated as an axial stop in the additional roller element 205 into the bearing cage 202, or are attached separately to the base body 111.

Figure 8:
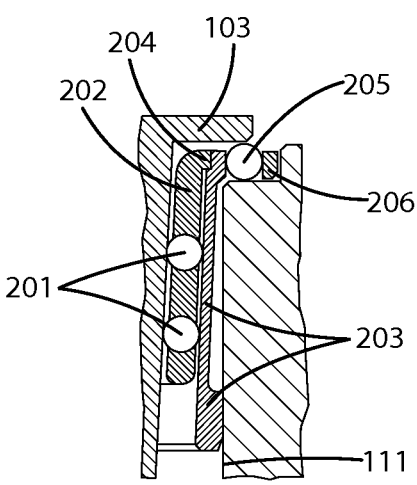
FIG. 8 is a detailed view of a bearing cage of the device.
Figure 9A:
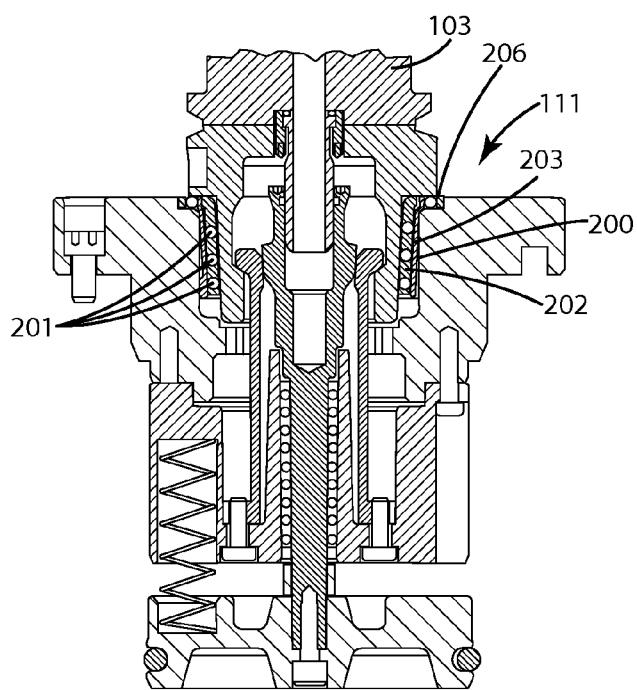
FIG. 9A is a cross-sectional view of a clamping device with a spring element.
Figure 9B:
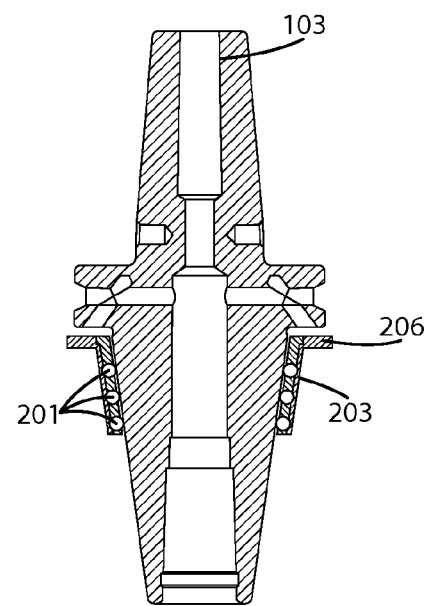
FIG. 9B is a cross-sectional detailed view of clamping device with a spring element.

However, it is more practical to systematically provide a spring element on one side, namely preferably on the side of the base body 111, as shown in FIGS. 5, 6 and 7 as well as in FIGS. 8 and 9. Namely a spring element which, indeed on one hand, provides a sufficient radial preloading, but then, on the hand, also limits the maximum amount of the preloading, so that neither plasticity nor local overload occurs at any location.

The FIGS. 6 and 7 show the first embodiment of this spring element. This is a sleeve inserted into the opening of the base body 111, which sleeve does not contact the base body 111 with its entire surface, but forms a cavity, a type of "bridge" on its side facing away from the roller elements 201, between its contact surfaces and thus comprises a segment, which acts as a bending spring.

The FIGS. 8 and 9 show an alternative embodiment for such a spring element. The spring element is configured here as a conical spring bushing, which is retained in the base body 111 with its upper collar shaped rim 206 only. Its conical portion, on the other hand, does not contact the base body 111 anywhere. The conical section is therefore resilient enough, so it can be expanded in outward direction in order to provide a diameter- or angle compensation through an angular movement, possibly in combination with a sufficiently resilient bearing cage 202. In this way, more than only fairly insignificant differences with respect to the geometry of the seat of the different work piece holders 103 can be compensated. Typically, an angle compensation of up to one minute of angle can be performed this way.

Another essential aspect of the invention in this second embodiment is that the tool holder 103 is also secured against rotation relative to the base body 111 by means of the roller elements 201 disposed in the wedge shaped gap.

For this purpose, multiple alternatives are provided according to the invention.

Figure 10:
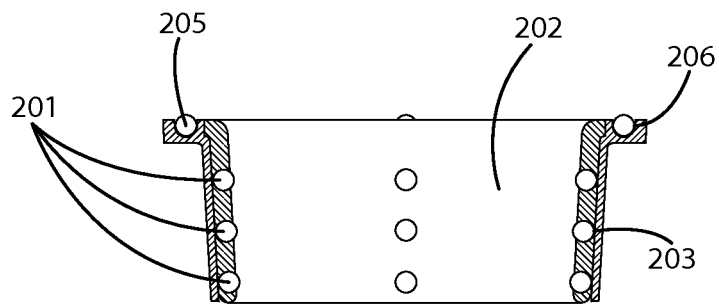
FIG. 10 is a detailed view of the bearing cage shown in FIGS. 7A and 7B.

FIG. 10 shows a first embodiment whose design corresponds to the sectional views shown in FIGS. 7a and 7b. No spring element is provided in the design shown in FIG. 11, which spring element was designated supra as 203. The roller elements 201 are rather directly supported at the essentially rigid wall of the base body 111. The inner surface of the opening in the base body 111, said opening is subsequently referred to as "base receiver", which receives the tool holder 103, does not have a contour of a circular cylinder here, but has a contour that differs substantially from the contour of a circular cylinder. The contact surface of the tool holder 103 corresponding therewith comprises a respective contour. This forms a gap between the tool holder 103 and the base body 111, which gap comprises a substantially constant gap height along a closed circumference line. Thus, the essential parameter is that the profile of the gap deviates from a circular shape by a significant amount, so that the tool holder 103 substantially cannot rotate relative to the base body 111, but can transfer the required torque between the tool holder 103 and the base body 111, since the tool holder 103 is supported through form locking in circumferential direction at the base body 111. It is evident that the amount and the manner by which the profile of the gap deviates from a circular shape has to be selected according to the torque to be transferred.

Figure 11:
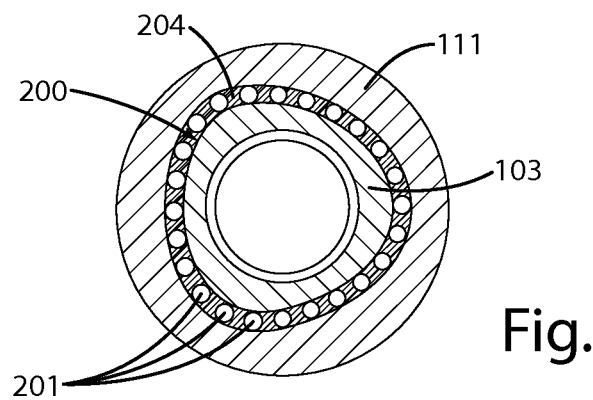
FIG. 11 is a cross-sectional view of a base body and a work piece.
Figure 12:
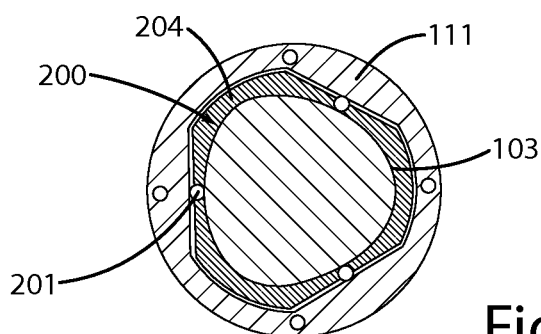
FIG. 12 is a cross-sectional view of a base body and a work piece.
Figure 13:
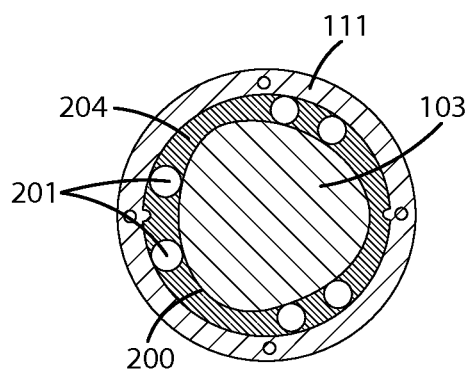
FIG. 13 is a cross-sectional view of a base body and a work piece.

Alternative options for securing the tool holder 103 relative to the base body 111 against rotation are shown in FIGS. 12 and 13. These solutions do not operate with a constant gap height, but they are also configured so that the seat of the tool receiver 103 tightens or wedges relative to the receiver of the base body 111 when a minimum relative rotation occurs. For this purpose, the seat of the tool receiver 103 is highly noncircular in both cases. Either a base receiver as shown in FIG. 11, which also strongly deviates from a circular cylindrical shape, corresponds to said seat of said tool receiver. Alternatively, though, the base receiver has a circular cylindrical profile, however, more then only three roller elements are disposed between the base receiver and the noncircular seat of the tool holder 103 interacting with said base receiver, so that the tool holder 103 in turn is fixated or clamped.

It is appreciated that in all applications, in which only relatively small torques have to be transmitted between the tool holder 103 and the base receiver 111 said rotation safeties can be provided in combination with a spring element 203, thus in particular a spring element 203 as shown in FIG. 6.

REFERENCE NUMERALS AND DESIGNATIONS

1a Clamping device
1. Change body
2. Base body
3. Not allocated
4. Not allocated
5. Pole spindle
6. Groove
7. Threaded connection
8. Clamping sleeve
9. Clamping cone
10. Cover
11. Roller element
12. Intermediary ring
13. Intermediary ring roller bearing
14. Tension rod
15. Tension rod coupling
16. Tension rod sleeve
17. Tension rod bolt section
18. Tension rod groove
19. Axial spring
20. Piston
21. Tension rod roller element
22. Cage
23. Cage collar
24. Onset portion of groove
25. Circumferential portion of groove
26. Groove end
27. Chuck
103. Work piece
111. Base body
123. Chuck
200. Gap
201. Roller element
202. Bearing cage
203. Spring element
204. Collar of bearing cage
205. Additional roller element
206. Collar rim of spring bushing
207. Additional spring element

The invention claimed is:

1. A clamping device (1a) for clamping a work piece at a rotating spindle of a machine tool, wherein the clamping device comprises a base body (2), which is configured to be fixated at the spindle and which comprises at least one change body (1) which can be coupled to and decoupled from the base body (2), wherein the change body (1) and the base body (2) are supported coaxially relative to one another and clamped relative to one another in radial direction by roller elements (11), wherein each of the roller elements (11) is disposed in a gap between the base body (2) and the change body (1), which is configured as a wedge shaped gap and adapted to the respective roller element (11), so that the respective roller element can be moved along the wedge shaped gap, deeper into the wedge shaped gap, when the base body (2) and the change body (1) are connected to one another, so that the desired clamping is provided in radial direction;

wherein the respective wedge shaped gap is also configured as a wedge shaped gap when viewed in circumferential direction, so that the tendency of the change body (1) to move in circumferential direction relative to the base body (2) causes a reinforcement of the radial clamping between the base body (2) and the change body (1), wherein the respective wedge shaped gap is configured, so that the roller element (11) also limits the relative movement between the base body (2) and the change body (1) in at least one circumferential direction, wherein the roller elements (11) are disposed in a bearing cage (22), which can be loaded with an external torque, so that the bearing cage (22) drives the roller elements

(11) into the wedge shaped gap, and/or drives them out of the wedge shaped gap, and wherein a ring (12) forms the two surfaces forming the wedge shaped gap, which ring is supported rotatable through a roller bearing (13), on the actual base body (2) or on the actual change body (1), and which is rotatable relative to the base body and also relative to the change body (1), so that the ring (12) rotates when the roller elements (11) roll on it when they are driven by the bearing cage (22).

2. A clamping device according to claim 1, wherein the respective wedge shaped gap and the associated roller element (11) are adapted to one another, so that the roller element (11) rolls on the side of the change body (1) and also on the side of the base body (2) when the roller element (11) is driven into the gap.

3. A clamping device according to claim 1, wherein the wedge shaped gap is at least configured in sections, so that the change body is also adapted to the base body in axial direction, when the roller element is moved further into the respective section of the wedge shaped gap.

4. A clamping device according to claim 1, wherein:
the respective wedge shaped gap is configured, so that the roller element (11) also limits the relative movement between the base body (2) and the change body (1) in at least one circumferential direction; and
the respective wedge shaped gap is also configured as a wedge shaped gap when viewed in circumferential direction, so that the tendency of the change body (1) to move in circumferential direction relative to the base body (2) causes a reinforcement of the radial clamping between the base body (2) and the change body (1).

5. A clamping device according to claim 4, wherein:
the roller elements (11) are disposed in a bearing cage (22), which can be loaded with an external torque, so that the bearing cage (22) drives the roller elements (11) into the wedge shaped gap, and/or drives them out of the wedge shaped gap; and
the bearing cage (22) comprises a collar (23) which protrudes outward into a portion which is disposed outside of the portion which is disposed between the base body (2) and the change body (1).

6. A clamping device according to claim 1, wherein the respective wedge shaped gap is configured as a local groove (6), which receives at least one roller element.

7. A clamping device according to claim 6, wherein the groove (6) comprises an onset portion (24) for inserting a roller element (11) from outside of the groove (6) into the groove (6), in which onset portion the groove axis extends substantially in the direction of the common rotation axis of the base body (2) and of the change body (1), and comprises a circumferential portion (25), connected to the onset portion (24), in which the groove axis extends in the direction of the circumference of the base body (2) or the change body (1).

8. A clamping device according to claim 7, wherein the groove (6) comprises a decreasing depth in its onset portion (24) and also in its circumferential portion (25), thus providing an increasing wedge effect in a direction oriented away from the onset portion (24).

9. A clamping device (1a) for clamping a work piece at a rotating spindle of a machine tool, wherein the clamping device comprises a base body (2), which is configured to be fixated at the spindle and which comprises at least one change body (1) which can be coupled to and decoupled from the base body (2), wherein the change body (1) and the base body (2) are supported coaxially relative to one another and clamped relative to one another in radial direction by roller elements (11), wherein each of the roller elements (11) is disposed in a gap between the base body (2) and the change body (1), which is configured as a wedge shaped gap and adapted to the respective roller element (11), so that the respective roller element can be moved along the wedge shaped gap, deeper into the wedge shaped gap, when the base body (2) and the change body (1) are connected to one another, so that the desired clamping is provided in radial direction;

wherein the respective wedge shaped gap is also configured as a wedge shaped gap when viewed in circumferential direction, so that the tendency of the change body (1) to move in circumferential direction relative to the base body (2) causes a reinforcement of the radial clamping between the base body (2) and the change body (1), wherein the respective wedge shaped gap is configured, so that the roller element (11) also limits the relative movement between the base body (2) and the change body (1) in at least one circumferential direction, wherein the roller elements (11) are disposed in a bearing cage (22), which can be loaded with an external torque, so that the bearing cage (22) drives the roller elements (11) into the wedge shaped gap, and/or drives them out of the wedge shaped gap, and wherein the bearing cage (22) is configured, so that it interacts with a blocking mechanism, which retains it so that, while the base body (2) or the change body (1) continue to move with the spindle of the machine tool, the roller elements (11) are driven into the wedge gap or driven out of the wedge gap due to said rotation of the spindle and due to the retention of the bearing cage (22).

10. A clamping device (1a) for clamping a work piece at a rotating spindle of a machine tool, wherein the clamping device comprises a base body (2), which is configured to be fixated at the spindle and which comprises at least one change body (1) which can be coupled to and decoupled from the base body (2), wherein the change body (1) and the base body (2) are supported coaxially relative to one another and clamped relative to one another in radial direction by roller elements (11), wherein each of the roller elements (11) is disposed in a gap between the base body (2) and the change body (1), which is configured as a wedge shaped gap and adapted to the respective roller element (11), so that the respective roller element can be moved along the wedge shaped gap, deeper into the wedge shaped gap, when the base body (2) and the change body (1) are connected to one another, so that the desired clamping is provided in radial direction, wherein the respective wedge shaped gap is configured, so that the roller element (11) also limits the relative movement between the base body (2) and the change body (1) in at least one circumferential direction, wherein at least one of the two sections of the base body (2) and the change body (1), which form a gap between each other, which is a wedge shaped gap in the direction of the common axis, comprises a noncircular outer contour when viewed in circumferential direction, the noncircular outer contour being one of an oval, an ellipse, or a rounded triangle or rectangle or a three-sided or four-sided epitrochoid profile, and wherein both sections comprise a non-circular outer contour, so that viewed along a closed circumference line, a gap with substantially constant height is formed between the base body (2) and the change body (1) when they are inserted into one another.

11. A clamping device according to claim 10, wherein:
the respective wedge shaped gap is configured, so that the roller element (11) also limits the relative movement between the base body (2) and the change body (1) in at least one circumferential direction; and
at least one of the two sections of the base body (2) and the change body (1), which form a gap between each other, which is a wedge shaped gap in the direction of the common axis, comprises a noncircular outer contour when viewed in circumferential direction, the noncircular outer contour being one of an oval, an ellipse, or a rounded triangle or rectangle or ideally a three-sided or four-sided epitrochoid profile.

12. A clamping device (1a) for clamping a work piece at a rotating spindle of a machine tool, wherein the clamping device comprises a base body (2), which is configured to be fixated at the spindle and which comprises at least one change body (1) which can be coupled to and decoupled from the base body (2), wherein the change body (1) and the base body (2) are supported coaxially relative to one another and clamped relative to one another in radial direction by roller elements (11), wherein each of the roller elements (11) is disposed in a gap between the base body (2) and the change body (1), which is configured as a wedge shaped gap and adapted to the respective roller element (11), so that the respective roller element can be moved along the wedge shaped gap, deeper into the wedge shaped gap, when the base body (2) and the change body (1) are connected to one another, so that the desired clamping is provided in radial direction,
wherein the change body (1) comprises a friction clutch (8, 9, 27), which can be actuated through axial forces, through which friction clutch the actual work piece can be clamped at the change body.

13. A clamping device according to claim 12, wherein the friction clutch (8, 9, 27) is a cone clutch with a chuck (27) or a clamping cone (9), which is moved e.g. through a tension/-compression device by a linear drive (20) against a clamping sleeve (8) configured at the change body (1).

14. A clamping device according to claim 13, wherein the tension/-compression device (14) comprises two components, which can in turn be connected to one another and separated from one another through a coupling (15).

15. A clamping device according to claim 14, wherein said coupling at the tension/-compression device (14) is comprised of two coupling halves (16, 17), which can be interlocked at one another like a bayonet coupling, wherein the one coupling half (16) is associated with the base body (2) together with the linear drive (20), and the other coupling half (17) is associated with the chuck (27) or the clamping cone (9).

16. A clamping device according to claim 15, wherein the clamping sleeve (8) is open in axial direction, so that the chuck (27) or the clamping cone (9) can be pulled out of the clamping sleeve (8) through the opening of the clamping sleeve after the coupling (15) has been disengaged.

17. A clamping device according to claim 16, wherein the chuck (27) or the clamping cone (9) and the clamping sleeve (8), as well as the tension/-compression device (14) are configured, so that at least one section of the chuck (27) or the clamping cone (9) protrudes outward beyond the clamping sleeve (8), as soon as the linear drive (20) has substantially removed the clamping between the chuck (7) or the clamping cone (9) and the clamping sleeve (8).

18. A clamping device according to claim 17, wherein the chuck (27) or the clamping cone (9) and the coupling (15) are configured, so that the chuck (27) or the clamping cone (9) can be gripped at their respective outward protruding sections, and can be moved, so that the coupling (15) is disengaged.

19. A clamping device according to claim 14, wherein the portion in which the base body (2) and the change body (1) are coupled coaxially to one another through radial clamping through roller elements (11) comprises an inner cavity, through which the tension/-compression device (14) reaches.

20. A clamping device according to claim 19, wherein the cavity receives the coupling (15) of the tension/-compression device (14).

* * * * *